(12) United States Patent
Berger

(10) Patent No.: US 8,109,372 B2
(45) Date of Patent: Feb. 7, 2012

(54) DAMPING VALVE

(75) Inventor: Stefan Berger, Würzburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 638 days.

(21) Appl. No.: 12/286,969

(22) Filed: Oct. 3, 2008

(65) Prior Publication Data

US 2009/0090588 A1    Apr. 9, 2009

(30) Foreign Application Priority Data

Oct. 4, 2007    (DE) .......................... 10 2007 047 516

(51) Int. Cl.
*F16F 9/34* (2006.01)

(52) U.S. Cl. ............ 188/322.15; 188/282.6; 188/322.22

(58) Field of Classification Search ............... 188/282.1, 188/282.5, 282.6, 322.15, 322.22
See application file for complete search history.

(56) References Cited

U.S. PATENT DOCUMENTS

| 4,993,524 | A  | * | 2/1991 | Grundei et al. | ............ 188/282.6 |
| 5,325,942 | A  | * | 7/1994 | Groves et al. | ............ 188/282.6 |
| 5,937,976 | A  | * | 8/1999 | Grundei | .................... 188/322.15 |
| 6,371,264 | B1 |   | 4/2002 | Deferme et al. | |
| 7,070,029 | B2 | * | 7/2006 | Deferme | .................... 188/322.15 |
| 2006/0185948 | A1 |   | 8/2006 | Schmitt | |

FOREIGN PATENT DOCUMENTS

| DE | 44 24 434 A1 | 3/1995 |
| DE | 100 28 114 A1 | 12/2000 |
| DE | 102 005 008 162 B3 | 3/2006 |

* cited by examiner

*Primary Examiner* — Christopher Schwartz
(74) *Attorney, Agent, or Firm* — Cozen O'Connor

(57) ABSTRACT

A damping valve includes a valve body, the valve body having at least one through hole and a valve seating surface. There is at least one valve disk configured to mate with the valve seating surface and at least partially seal the through hole and a first spring configured to bias the at least one valve disk towards the valve seating surface. A stop ring is configured to support the first spring on a first surface and an intermediate ring is configured to be supported by the stop ring on a second surface of the stop ring opposite the first surface. A second spring is configured to bias the intermediate ring against the stop ring.

15 Claims, 4 Drawing Sheets

DAMPING VALVE

BACKGROUND OF THE INVENTION

1. Field of the Invention

The invention pertains to a damping valve for a vibration damper.

2. Description of the Related Art

A damping valve which comprises two valve stages is disclosed in DE 100 28 114 A1. A first valve stage is formed by at least one valve disk, which is pretensioned onto a valve seating surface of a valve body. The minimum of one valve disk is supported on one side against the valve seating surface and at least indirectly against an intermediate ring, in this case a tension stage holder, which is pretensioned toward the valve body by a valve spring.

At low piston rod speeds, only the minimum of one valve disk rises from the valve seating surface. The valve spring of the intermediate ring acts as an opposing force to the hydraulic lifting force. The result is an interdependence between the damping force characteristics of the two valve stages.

DE 10 2005 008 162 B3 discloses a multi-stage damping valve, in which at least one elastic valve is clamped between a valve seating surface of a valve body and a valve seating surface on an intermediate ring. The intermediate ring in turn is pretensioned against the valve body by a valve spring. In this solution as well, there is a certain interdependence of the damping forces between the two valve stages, because the valve spring must absorb the damping forces of the first valve stage, and it also determines the damping forces of the second stage.

SUMMARY OF THE INVENTION

The present invention relates to a damping valve in which the damping forces of the two valve stages are variable.

According to one embodiment of the invention, the damping valve has an axial stop for the intermediate ring. This stop determines the position of the intermediate ring at least while the first valve disk is in full contact with the valve seating surface. The elastic force for the first valve disk is supported independently of the intermediate ring against a separate surface.

In one embodiment of the invention, the force required to lift the valve disk is determined independently of the second damping valve stage.

In one embodiment of the invention, after at least one first valve disk has moved a defined distance, it comes to rest at least indirectly on the intermediate ring. In the starting positions of the minimum of one valve disk and the intermediate ring, there is an axial gap between the two parts; this gap has an influence on the characteristic curve between the two valve stages.

In one embodiment of a damping valve design having a high degree of variability, a stop ring forms the stop.

In one embodiment of the damping valve, the intermediate ring is supported on a first side of the stop ring and a separate surface for supporting the elastic force for the at least one valve disk is formed on the other side.

According to one embodiment, the stop ring is preferably an angle ring. An intermediate ring with a cup-like profile yields a minimum axial length.

In addition to the stop function, the angle ring preferably centers the intermediate ring radially.

The stop ring is supported axially against the valve body by a spacer ring. The height of the spacer ring determines the amount of space available for the at least one valve disk and the spring which generates an elastic force acting toward the valve seating surface.

In one embodiment, the valve disk is preferably centered radially on the spacer ring.

The various features of novelty that characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
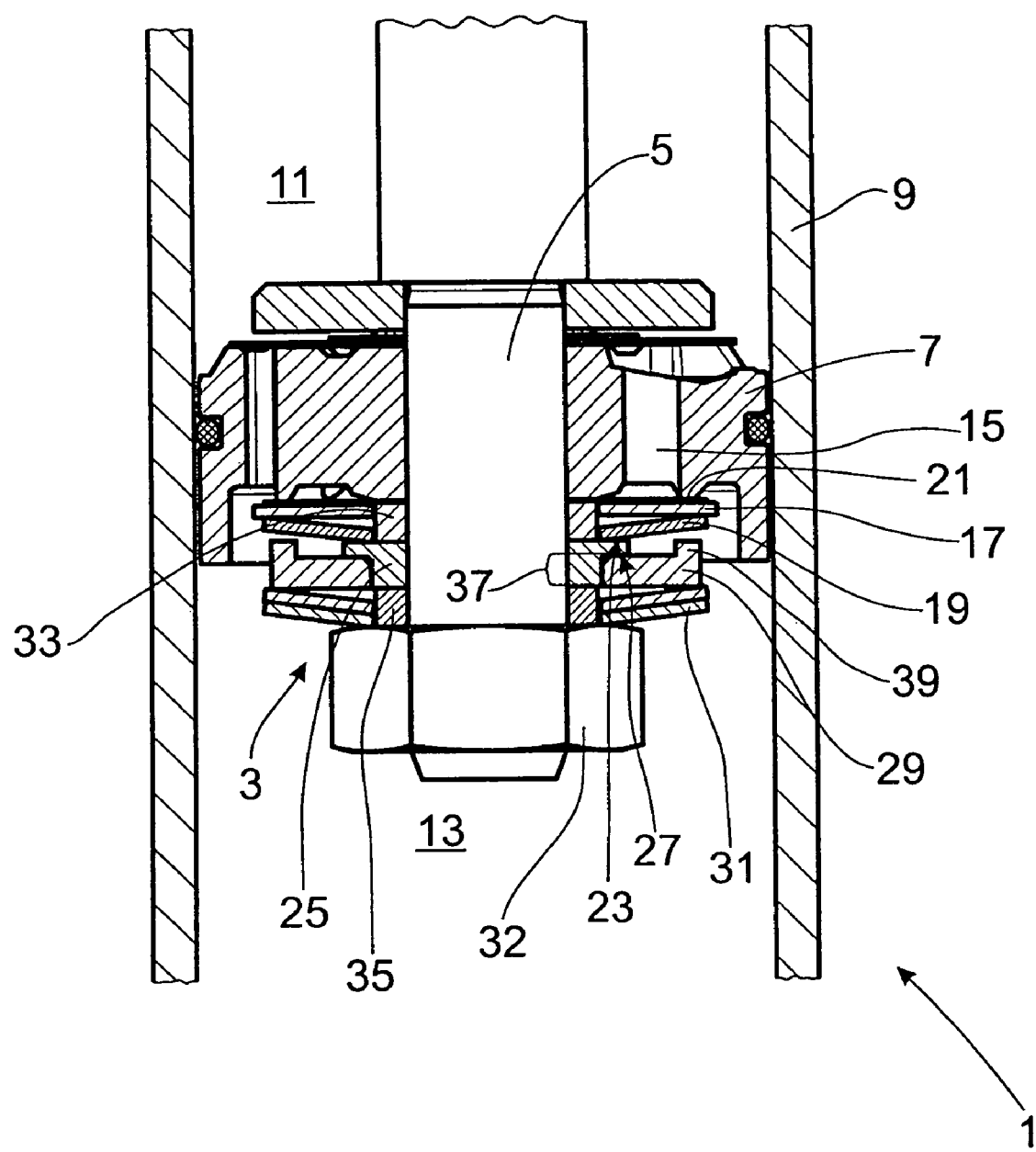
FIG. 1 is a sectional view of a damping valve in the starting position according to one embodiment of the invention.

FIG. 1 shows a part of a vibration damper 1 in the area of a damping valve 3 of a piston valve mounted on a piston rod 5. The invention is not limited to an arrangement of this type but can also be applied, for example, to a bottom valve in any desired type of vibration damper.

A valve body 7 on the piston rod 5 divides a cylinder 9 filled with any desired type of damping medium into two working spaces 11 and 13. In the valve body 7, a through-channel 15 is provided for flow in at least one direction. This channel is at least partially closed at its outlet by at least one valve disk 17. A first spring 19, preferably designed as a disk spring, spring-loads the valve disk 17 onto a valve seating surface 21 of the valve body 7. The first spring 19 is supported in the area of its inside diameter on a flange 23 of a stop ring 25. The stop ring 25 is designed as an angle ring, the second side of which forms a support surface 27 for an intermediate ring 29. At least one valve spring 31 acts on the side of the intermediate ring 29 facing away from the valve disk 17. A fastening nut 32 clamps the valve body 7 to a shoulder on the piston rod by way of a first spacer ring 33, the stop ring 25, and a second spacer ring 35. The first valve disk 17 and the spring 19 are preferably self-centering on the first spacer ring 33. The radial positioning of the intermediate ring 29 is accomplished by the stop ring 25 and sleeve 37 that extends toward the fastening nut 32. The second spacer ring 35 centers the valve spring 31.

FIG. 1 depicts damping valve 3 in a starting position, in which the valve disk 17 is resting fully on the valve seating surface 21. The valve disk 17 is supported independently of the intermediate ring 29 on the flange 23 of the stop ring 25, which is preferably separate from the intermediate ring. There is an axial gap, which is shown larger than it actually is, between the valve disk 17 and the intermediate ring 29. The intermediate ring 29 preferably has a cup-like profile. The intermediate ring 29 rests against the support surface 27 of the stop ring 25. A circumferential edge 39 of the intermediate ring 29 points toward the valve disk 17.

Figure 2:
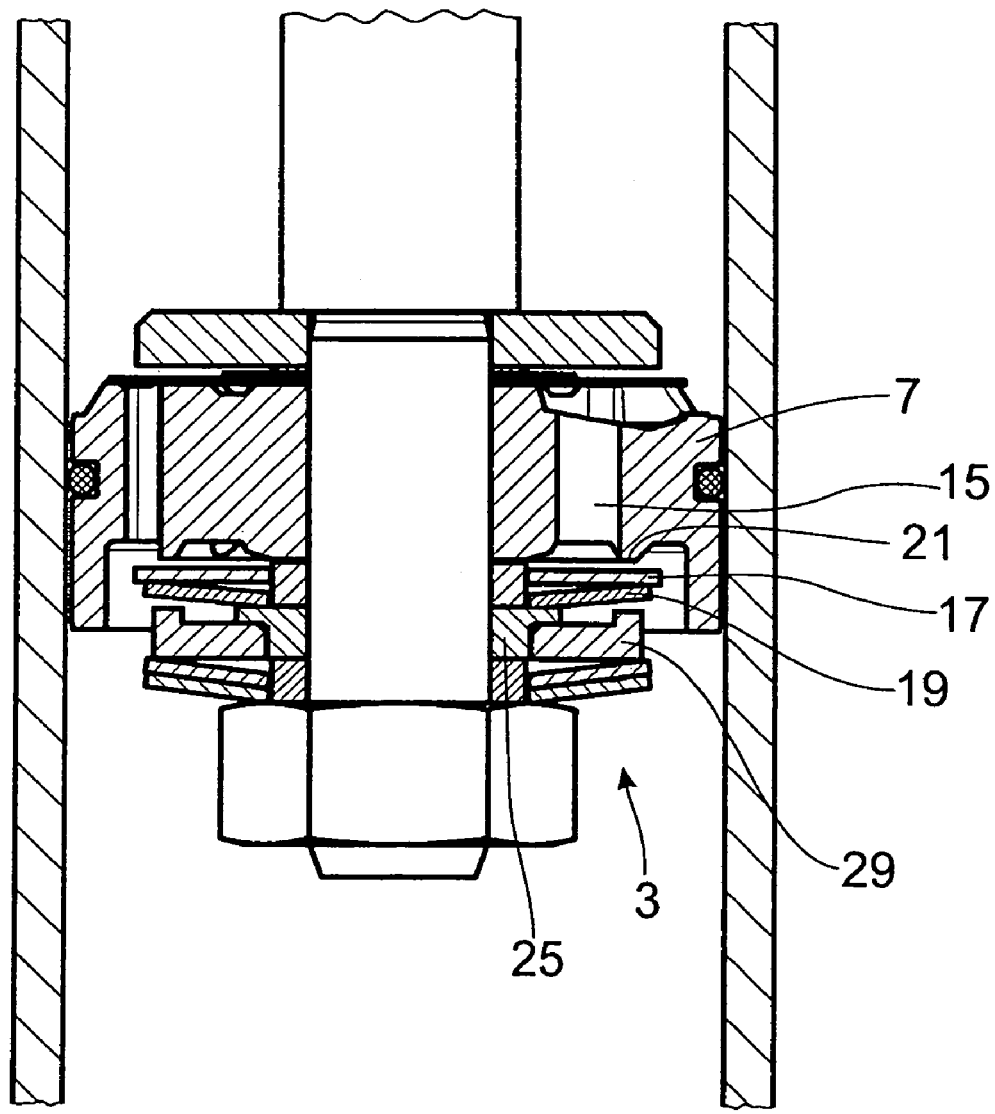
FIG. 2 is a sectional view of a damping valve with the first damping valve stage in action according to one embodiment of the invention.

In FIG. 2, the valve disk 17 has been lifted slightly from the valve seating surface 21 of the valve body 7, against the force of the spring 19 as a result of the pressure relationships in the through-channel 15. The intermediate ring 29 is preferably resting on the stop ring 25, so that the damping force acting in a first damping force stage is determined by the closing force of the spring 19. The valve spring 31 has no effect on the damping force, because of the stop position of the intermediate ring 29.

Figure 3:
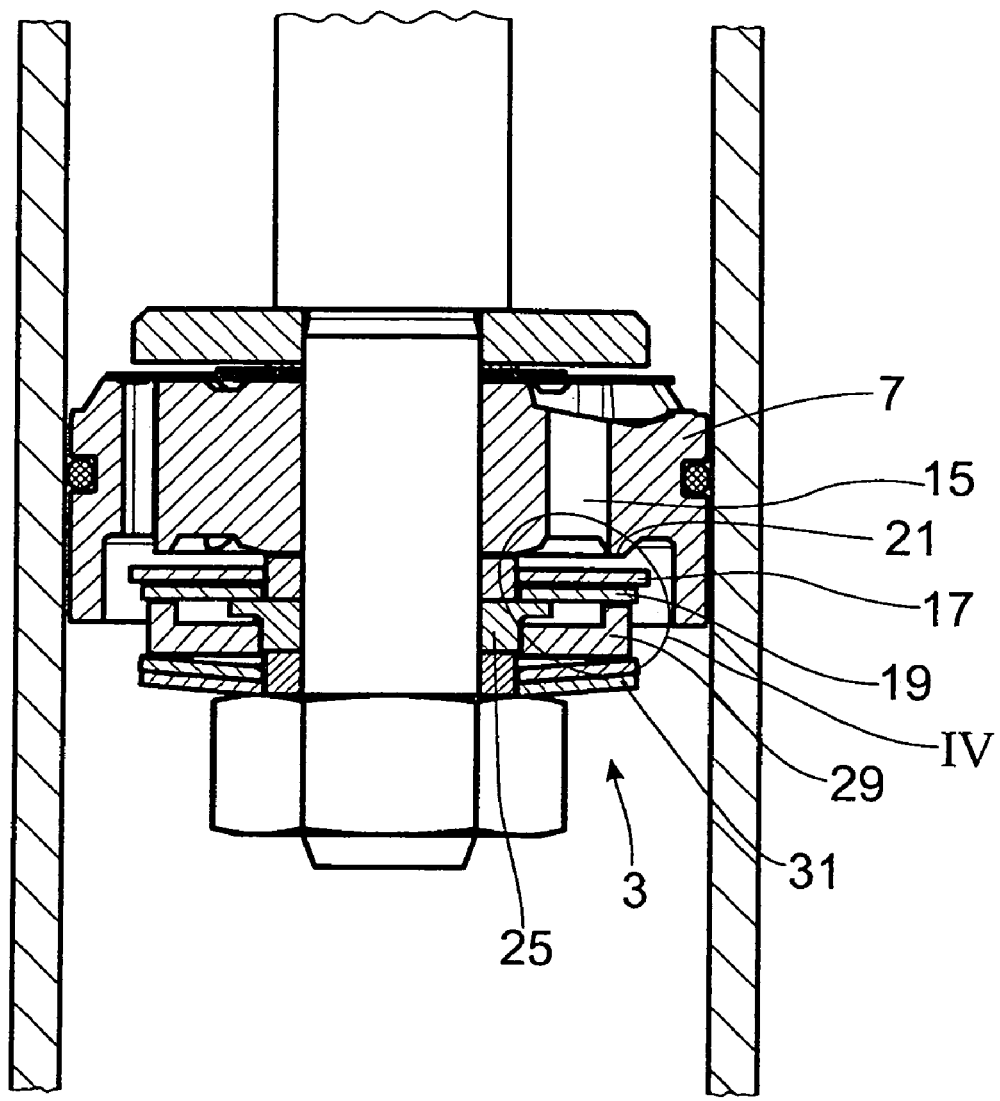
FIG. 3 is a sectional view of a damping valve with the second damping valve stage in action according to one embodiment of the invention.

FIG. 3 illustrates an operating state of the damping valve 3 in which the valve disk 17 has come to rest against the intermediate ring 29 after having risen from the valve seating surface 21 by a defined distance. As a result, the valve spring 31, together with the spring 19, now determines the damping force. The valve disk 17 is supported directly or indirectly by way of the spring 19 on the intermediate ring 29. The intermediate ring 29 is lifted from the support surface 27 of the stop ring 25, as a result of which the damping valve 3 is now in its second damping force stage.

Figure 4:
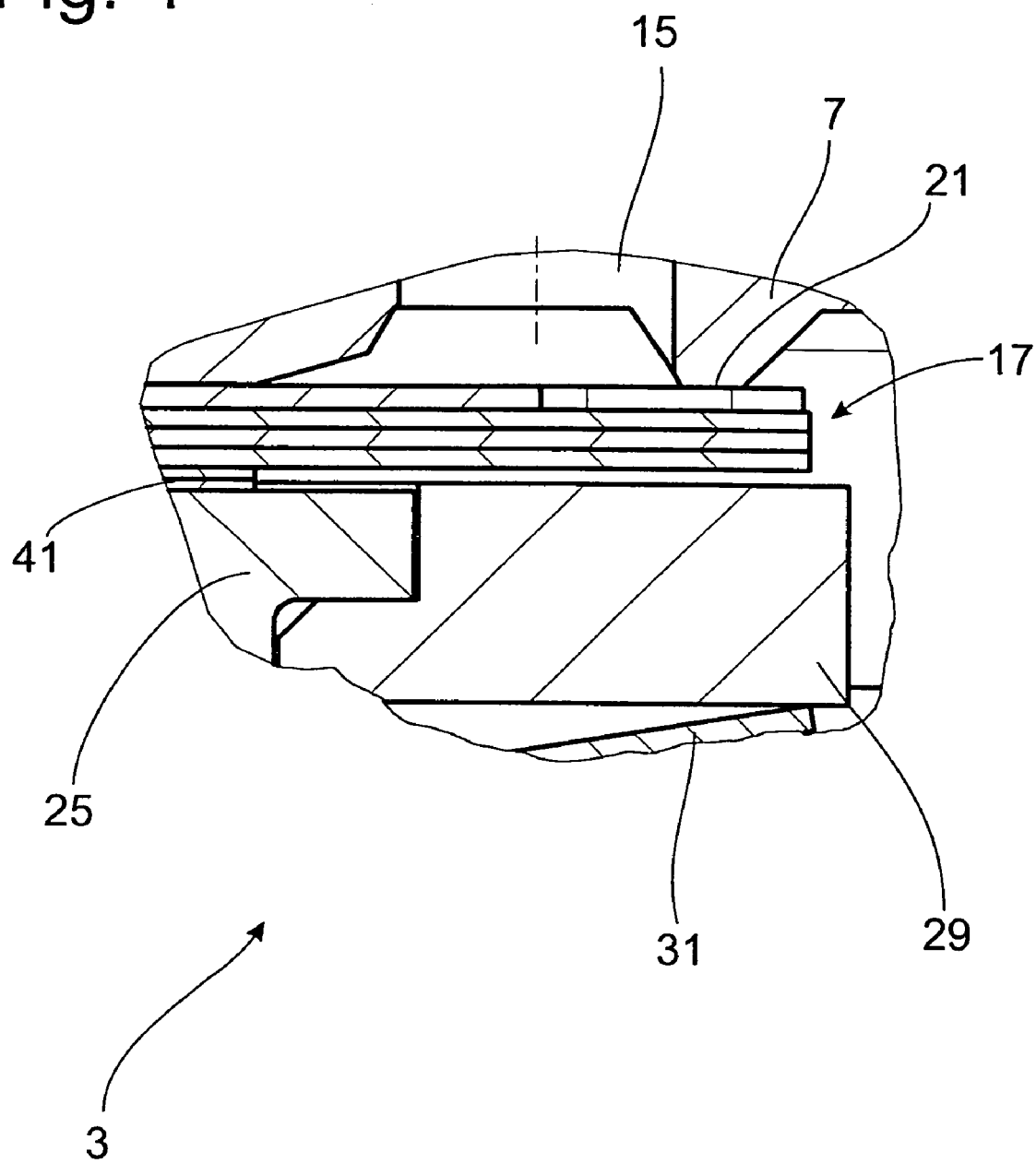
FIG. 4 is a sectional view of an embodiment of a valve disk clamped permanently in a certain axial position.

FIG. 4 shows an enlarged view of part of a variant of the damping valve 3, in which the valve disk 17 is elastic, and the gap between the valve disk 17 or valve disk package and the intermediate ring 29 is adjusted by means of at least one spacer disk 41. The valve disk package and the minimum of one spacer disk are clamped axially between the stop 25 and the valve body 7. The principle by which this embodiment operates is substantially the same as that of the embodiment of FIGS. 1-3.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A damping valve, comprising:
    a valve body having a valve seating surface and at least one through-channel, the at least one through-channel having an outlet;
    at least one valve disk configured to seat onto the valve seating surface, the at least one valve disk being elastically pretentioned onto the valve seating surface to at least partially close the at least one through-channel;
    an intermediate ring pretentioned toward the at least one valve disk by at least one valve spring, the at least one valve disk cooperating with the intermediate ring and the valve spring at least after the at least one valve disk has risen a defined distance from the valve seating surface; and
    an axial stop for determining the position of the intermediate ring at least while the valve disk is seated on the valve seating surface, wherein
    the at least one valve disk is elastically pretentioned onto the valve seating surface by an elastic force that is supported independently of the intermediate ring.

2. The damping valve according to claim 1, wherein the stop is a stop ring.

3. The damping valve according to claim 2, wherein the stop ring is configured as an angle ring.

4. The damping valve according to claim 3, wherein the intermediate ring substantially centered radially on the angle ring.

5. The damping valve according to claim 2, wherein the stop ring is supported axially on the valve body by a spacer.

6. The damping valve according to claim 5, wherein the at least one valve disk is substantially centered radially on the spacer ring.

7. The damping valve according to claim 2, wherein the intermediate ring is supported on a first side of the stop ring and a second side of the stop ring supports the elastic force for pretensioning the at least on valve disk.

8. The damping valve according to claim 1, wherein the at least one valve disk is configured to contact with the intermediate ring after the at least one valve disk has risen a defined distance from the valve seating surface.

9. The damping valve according to claim 1, wherein the intermediate ring has a cup-shaped profile.

10. The damping valve according to claim 1, wherein the elastic force on the at least one valve disk determines the damping force for a first pressure range in the through-channel.

11. A damping valve, comprising:
    a valve body, the valve body having at least one through hole and a valve seating surface;
    at least one valve disk configured to mate with the valve seating surface and at least partially seal the through hole;
    a first spring configured to bias the at least one valve disk towards the valve seating surface;
    a stop ring configured to support the first spring on a first surface of the stop ring;
    an intermediate ring configured to be supported by the stop ring on a second surface of the stop ring opposite the first surface; and
    a second spring configured to bias the intermediate ring against the stop ring.

12. The damping valve according to claim 11, wherein the at least one valve disk is configured to unseat from the valve seat in response to pressure in the through hole.

13. The damping valve according to claim 11, wherein the intermediate ring is cup shaped.

14. The damping valve according to claim 11, further comprising at least one spacer arranged between the at least one valve disk and the stop ring.

15. The damping valve according to claim 14, wherein the at least one spacer adjusts a space between the at least one valve disk and the intermediate ring.

* * * * *